United States Patent Office.

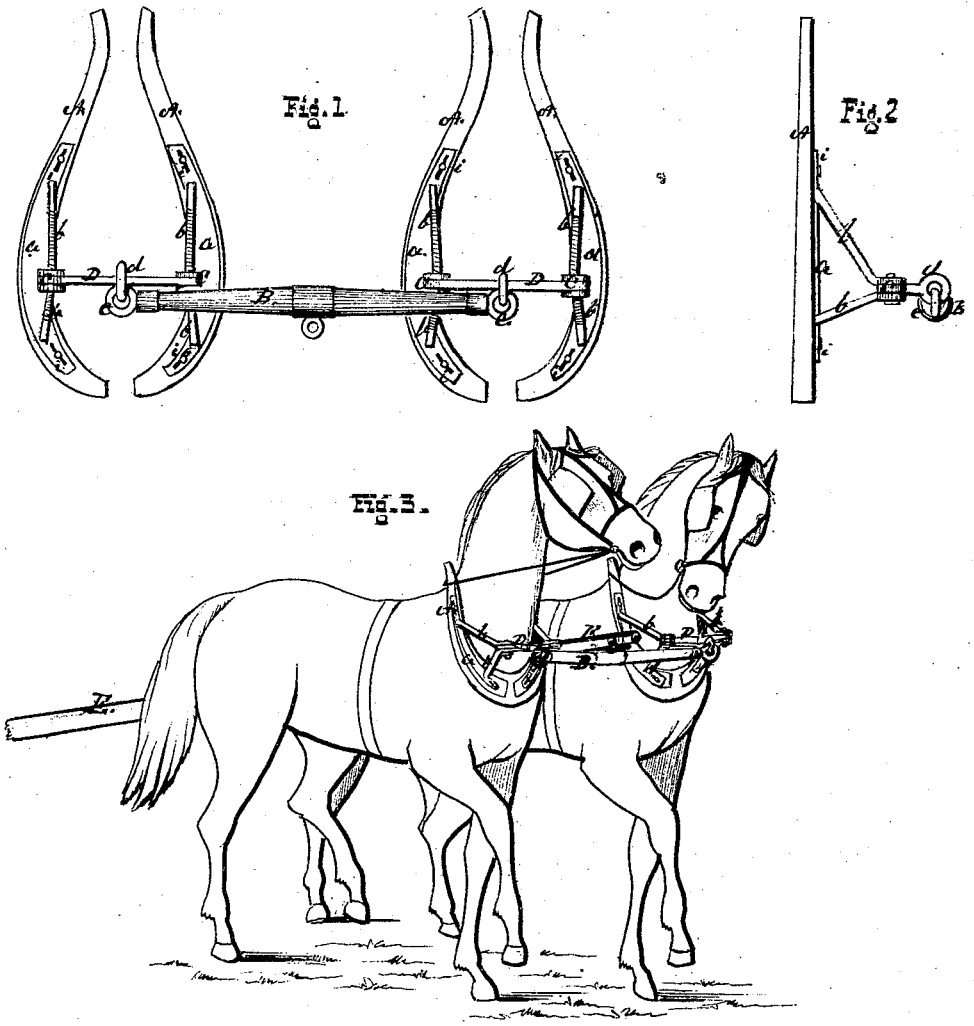

GEORGE CHAMBERLIN, OF OLEAN, NEW YORK.

Letters Patent No. 107,335, dated September 13, 1870.

IMPROVEMENT IN DRAFT-HARNESS.

The Schedule referred to in these Letters Patent and making part of the same

*To all whom it may concern:*

Be it known that I, GEORGE CHAMBERLIN, of Olean, in the county of Cattaraugus and State of New York, have invented certain new and useful Improvements in Hame-Harness for Working Horses without Tugs or Whiffletrees for Plowing, Harrowing, and other Farm Purposes; and the following is a full, clear, and exact description of the same, reference being had to the accompanying drawing making a part of this specification, in which—

Figure 1 represents the frames of two hame-collars, as constructed and connected by the neck-yoke.

Figure 2 shows an edge view of the frame of a hame, with the mode of attaching the neck-yoke.

Figure 3 represents a pair of horses fully harnessed and equipped for plowing or other cultivating.

The object of my invention is to dispense with all of the cumbersome, unnecessary gear, trappings, and fixtures which take time to put on and take off, and and which sweat, chafe, and gall the animals while at work in the field; and It consists in the construction and arrangement of the devices for connecting the hames to the neck-yoke, and the hitching of the plow or other agricultural implement to the neck-yoke, so that the draft is brought to bear directly on the hame-collars in as natural a manner as it can be by the use of tug-strap and whiffletrees.

To enable others to make and use my improvement, I will describe it more fully, referring to the drawing and the letters marked thereon.

To the wood frames A A I secure plates of metal *a a*, to which are connected braces, *b b*, projecting out in front a suitable or the required distance, to be in the proper position to attach the neck-yoke B.

At the apex of the braces *b b* there are joints C C, in which a metal bar, D, is secured, to connect the two sides of the frame A A together, which joints, C C, allow the hames to be opened, and yield easily to the motion of the horses when at work.

In the center of the bar D there is a swivel-ring, *d*, to which the rings *e e*, in the ends of the neck-yoke B, connect the yoke with the two hame-collars.

In using a mowing or reaping-machine, or other implement constructed with a long tongue or pole, E, it is hitched directly to the neck-yoke B, as seen in fig. 3. Implements like the plow, having a short beam, and cultivators, harrows, and other implements may require a chain to hitch them, in the same manner as they are hitched when they are drawn by oxen.

The hame-frames A A may be padded on the portion that bears on the shoulders and breasts of the horses.

The plates *a a* are provided with slots *i i*, so that they may be moved up or down on the frame A A, to bring the bearing in the easiest place for draft on the horses.

Thus it will be seen that horse-teams can be hitched up or put out as quick as oxen, and are as disencumbered while at work.

What I claim as my invention is—

The combined collar and hames, provided with plates *a a*, braces *b b*, joints C C, and bars D D, when hinged to the braces *b b* and connected to the yoke B by the swivel-joints *d d*, all arranged as herein shown and described.

In testimony whereof I hereunto subscribe my name in the presence of—

GEORGE CHAMBERLIN.

Witnesses:
W. H. RAMSEY,
H. W. CHAMBERLIN.